US005243244A

United States Patent [19]

Kasberger et al.

[11] Patent Number: 5,243,244

[45] Date of Patent: Sep. 7, 1993

[54] MIXER MOTOR WITH SPLASHPROOF HOUSING

[75] Inventors: Peter Kasberger, Aystetten; Fredy Fradl, Augsburg, both of Fed. Rep. of Germany

[73] Assignee: Lescha Maschinenfabrik GmbH & Co. KG, Augsburg, Fed. Rep. of Germany

[21] Appl. No.: 797,182

[22] Filed: Nov. 25, 1991

[30] Foreign Application Priority Data

Dec. 21, 1990 [DE] Fed. Rep. of Germany ....... 4041424

[51] Int. Cl.[5] .......................... H02K 9/06; H02K 5/10

[52] U.S. Cl. ........................................ 310/88; 310/58; 366/60

[58] Field of Search ....................... 310/52, 53, 58, 59, 310/60 A, 62, 63, 85, 88, 89, 71; 174/17 R, 17.06, 17 VA; 366/60, 220

[56] References Cited

U.S. PATENT DOCUMENTS

| | | | |
|---|---|---|---|
| 1,848,511 | 3/1932 | Adamcikas et al. | 310/58 |
| 1,920,315 | 8/1933 | Myers | 310/63 |
| 2,604,501 | 7/1952 | Wightman | 310/63 |
| 2,801,085 | 7/1957 | Maxon, Jr. | 259/171 |
| 2,950,402 | 8/1960 | Glaza | 310/56 |
| 3,749,953 | 7/1973 | Baumann et al. | 310/62 |
| 3,768,785 | 10/1973 | Susemihl | 259/177 R |
| 4,086,507 | 5/1978 | Roland et al. | 310/88 |
| 4,135,171 | 1/1979 | Violet | 366/60 |
| 4,143,973 | 3/1979 | Hauser | 366/54 |
| 4,223,997 | 9/1980 | Violet et al. | 366/47 |
| 4,766,337 | 8/1988 | Parkinson et al. | 310/58 |

*Primary Examiner*—Steven L. Stephan
*Assistant Examiner*—D. R. Haszko
*Attorney, Agent, or Firm*—Harrison & Egbert

[57] ABSTRACT

In the case of a mixer for constructional materials or the like, comprising a driven drum which is rotatably mounted on a yoke pivoting on a frame and is able to be driven by means of a frame-mounted drive device including an air-cooled electric motor which is arranged in an encapsulating means, provided with a switch and plug unit and having an air intake opening and an air outlet opening and which is adapted via a countershaft to drive a drive shaft which is associated with the drum and whose axis of rotation is in alignment with the pivot axis of the yoke, wherein the encapsulating means is constituted by a housing means accommodating the motor and the countershaft transmission, and having an air intake opening in communication with a flow reversing intake duct and whose outlet opening leads into a spent air duct which ends outside the housing means and is designed to prevent access therethrough, simple and low-cost means are utilized to ensure that the mixer has a comparatively high degree of safety and ease of use while nevertheless rendering rational manufacture possible, since in accordance with the invention the encapsulating means is constituted by a housing means accommodating the motor and the countershaft transmission, and having an air intake opening in communication with a flow reversing intake duct and whose outlet opening leads into a spent air duct which ends outside the housing means and is designed to prevent access therethrough.

16 Claims, 4 Drawing Sheets

FIG. 2
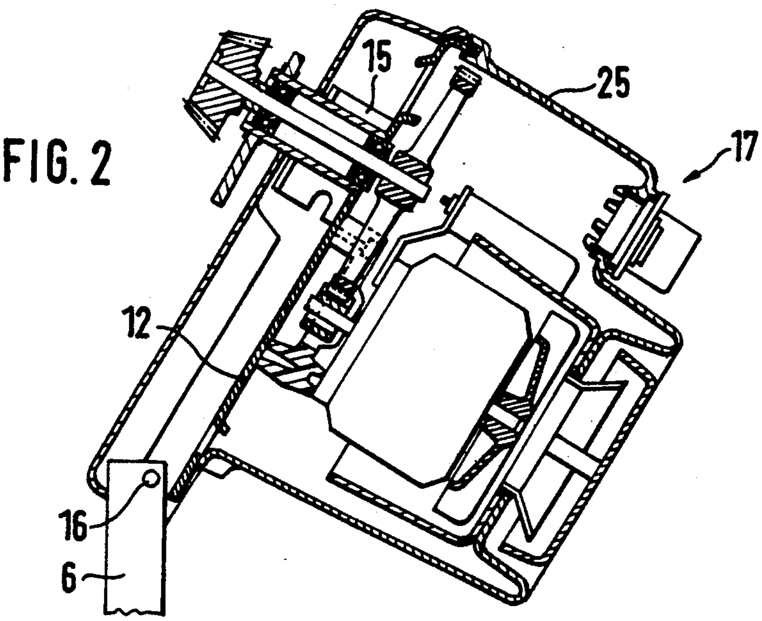
FIG. 3
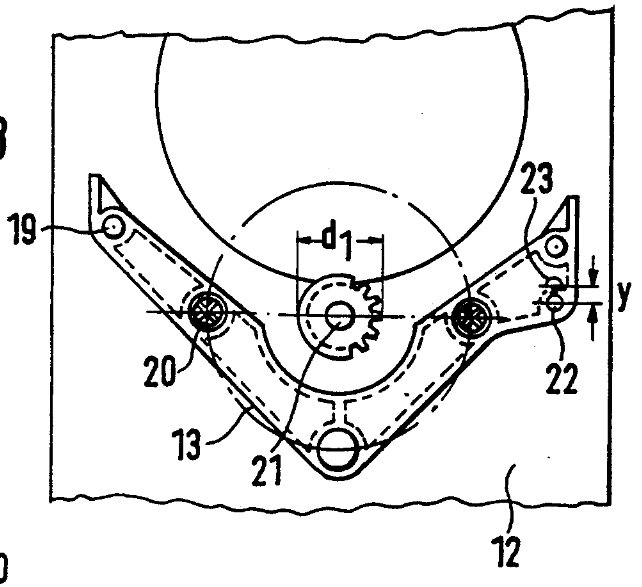
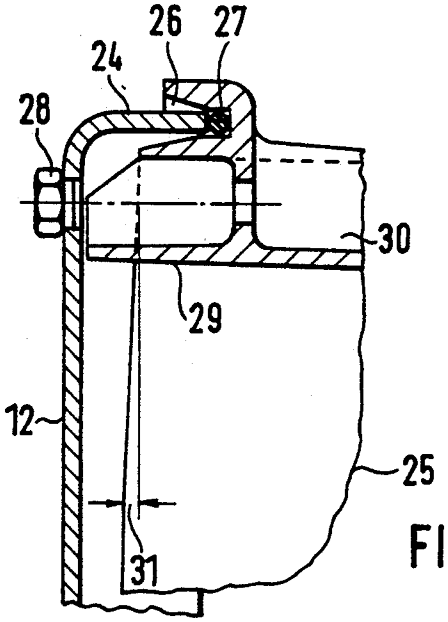
FIG. 4

MIXER MOTOR WITH SPLASHPROOF HOUSING

BACKGROUND OF THE INVENTION

The invention relates to a mixer and more particularly to a mixer for constructional materials comprising a driven drum which is rotatably mounted on a yoke pivoting on a frame and is able to be driven by means of a frame-mounted drive device including an air-cooled electric motor which motor is arranged in a frame mounted encapsulating means, provided with a switch and plug unit and having an air intake opening and an air outlet opening, and which motor is adapted via a countershaft transmission to drive a drive shaft which is associated with the drum and whose axis of rotation coincides with the pivot axis of the yoke.

In the case of a known arrangement of this type the encapsulating means takes the form of a synthetic resin housing, which only accommodates the motor. The countershaft transmission is not included within it. Accordingly the synthetic resin housing for the motor is located within a second protective housing, which also covers the countershaft transmission. This second protective housing is however open in a downward direction in order to provide for access to the switch and electrical plug unit mounted on the synthetic resin housing constituting a shroud around the motor. In order to form the air intake opening and the air outlet opening there are in this case slots constituted by a cover, which defines a gap, and respectively by wall cutouts. In the case of the known arrangement there is the likelihood of water being splashed upwards into the outer guard housing. Thus on the one hand this splashed water may spread out along the parts of the transmission so that there is the danger of the insulating function performed by the parts of the transmission being overridden by such creeping water and furthermore it is possible for the water to leak into the electric motor itself. Furthermore on the other hand there is the substantial chance of water being splashed directly into the electric motor through the air intake and outlet openings. The consequence of this may well be a short circuiting of the motor and the formation of water film bridges and hence damage to the motor or an impairment of the protective insulation. There is also the danger that anyone poking a thin metal object into the enclosure such as a piece of wire may make contact with a live part, since parts of this type may be introduced into the synthetic resin housing and through the air intake and air outlet openings. The known arrangement has therefore not proved to be sufficiently safe.

A further disadvantage is to be seen in the fact that the switch and plug unit arranged on the synthetic resin housing covered by the outer protective housing is not very accessible and may only be seen on stooping. The known arrangement is thus awkward to use. Nevertheless the known arrangement involves a comparatively elaborate design, since in addition to the synthetic resin housing for the motor there is also the requirement for a second protective housing accommodating the countershaft transmission and the synthetic resin housing. This disadvantage is made even more serious since the switch and plug unit is molded on the synthetic resin housing. It is consequently necessary to provide an assortment of different synthetic resin housings for adaptation to the switch and plug units complying with the various national technical standards.

SHORT SUMMARY OF THE INVENTION

Taking this state of the art as a starting point one object of the invention is to provide a mixer of the type initially mentioned with simple and low-cost means so that it has a comparatively high degree of safety and ease of use while nevertheless rendering rational manufacture possible.

In order to attain these and/or other advantages in the invention the encapsulating means is constituted by a housing means accommodating the motor and the countershaft transmission, and having an air intake opening in communication with a flow reversing intake duct and whose outlet opening leads into a spent air duct which ends outside the housing means and is designed to prevent access therethrough The presence of these features means that the disadvantages of the known constructions are completely avoided. The features in accordance with the invention lead to the advantage of not only offering complete protection against splashing water but also against electrical shocks. Nevertheless, the combination in accordance with the invention makes do with only one housing, this having an advantageous effect as regards simplicity of design. A further advantage is to be seen in the fact that the switch and plug unit which is accommodated on a single housing, is readily accessible and readily inspected without this possibility leading to a disadvantage as regards the safety and the degree of complication.

Advantageous developments and convenient further designs in accordance with the invention are recited in the claims. Thus for example it is convenient for the air intake duct to be designed in the form of an annular pipe which is arranged in an outwardly opening concavity in a wall of the housing containing the intake opening and to be adapted to reverse flow in the form of a baffle insert which is coaxial to the intake opening. These features lead not only to a sufficiently large orifice, obtainable with simple means, but also advantageously simultaneously produce a labyrinth-like configuration of the intake duct and consequently a more particularly reliable protective system against splashed water and against the danger of making chance electrical contact with live parts and electric shocks.

In accordance with a further possible development of the invention it is possible for the intake opening to be connected with an outwardly widening conical duct which is covered by a bell part arranged in an inwardly directed wall. The resulting configuration of the intake duct as a labyrinth-like structure ensures that as far as the first or the second flow reversing means therein water will be automatically diverted back outward and removed. It is an advantage consequently that the intake duct may be cleaned by squirting water thereinto without any impairment of operator safety.

A further possible feature of the invention is such that the intake opening is covered by a baffle plate which is more or less coaxial thereto and has an outwardly directed rim which is overlapped by a circumferential crown of a grid-like cover closing the associated wall concavity. This design is responsible for a particularly high degree of safety for the operator, not only as regards splashed water but also as regards use of a jet of water for cleaning. This design is hence suitable for particularly hazardous applications.

It is an advantage if the intake opening is connected with an air guide part which at least partly surrounds the motor and opens in an inward direction. This feature ensures a reliable ducting of the cooling air and hence leads to a highly efficient cooling action. Simultaneously it is responsible for a certain stiffening of the housing, if this should be desired.

In accordance with a further possible development of the invention the motor is provided with an impeller facing the intake opening and closed on the motor side. This feature provides a further barrier useful in the unlikely event of drops of water entrained in the air passing through the intake opening.

In keeping with yet another form of the invention it is possible for the housing, which has a covering hood (which is open the drum side) to be shut on the drum side by an assembly base plate or platform supported on the frame and preferably resting on a beam of the frame, on which preferably the motor is arranged with an intermdiate insulating bracket and the countershaft transmission, which is preferably is in the form of a gearwheel transmission, is also arranged and which has an opening for spent air. These features ensure the advantage of pre-assembly and checking of the complete drive device as a modular subassembly, something that considerably simplifies final assembly and final inspection. The use of a gearwheel transmission as the countershaft transmission leads not only to a reliable transmission of the torque but also leads to the advantage that there is no need for continual adjustment as is necessary in the case of conventional belt drive countershaft transmissions. This ensures that the housing does not have to be accessible during operation and furthermore no allowance for tautening is required, this rendering a compact design possible.

In order to form a spent air duct adjoining the spent air opening it is possible in this respect simply to use the beam of the frame on which the assembly base plate is arranged. For this purpose it is possible for the spent air opening to simply lead into the beam of the frame on which the space stage is arranged, such beam being in the form of a spent air duct which is open at its lower end and is closed at its top one.

In accordance with a further embodiment of the invention, which comes into question if the frame beam does not have a sufficiently large cross section, the spent air duct is constituted by a cap able to be arranged on the assembly base plate on the drum side thereof and which in order to form the housing downwardly overlaps the hood which is able to be fixed in position opposite to the assembly base plate. Owing to this downward overlap there is simple flow revesing configuration for the spent air duct adjacent to the opening.

In order to produce a more particularly high degree of operator safety it is possible for the hood to be provided with water jet baffles which are more particularly in the form of ribs.

A further advantageous feature of the invention is such that the assembly base plate has a drain opening which is arranged adjoining the lower edge of the hood and preferably opens into the adjacent beam of the frame. This ensures that the condensate or reasonable quantities of water making their way into the housing are drained off, preferably via the frame beam.

In accordance with a further possible advantageous development of the invention the switch and plug unit, which is arranged in a drawn in part of the housing (preferably overlapping the motor), is constructed in the form of a separate component, which is preferably provided with catch teeth fitting behind an associated recess in the hood, and has a circumferential sealing element. Owing to the fact that the switch and plug unit is constituted by a separate component it is only necessary to replace this component for adaptation to suit different national standards. The catch teeth in the form of retainer elements render possible not only simple assembly by also lead to the advantage of a reliable adaptation on all sides and thus to a highly efficient sealing action.

It is an advantage as well if an electrical coupling part or socket is provided connected with the motor by wiring and preferably mounted in the part overlapping the motor, such coupling part being adapted to be pluggedly connected with a coupling part mounted on the hood and electrically connected with the switch and plug unit. These measures ensure that the motor is definitely disconnected electrically when the hood is removed. Simultaneously the said features render it possible to perform a simple pre-assembly of the complete drive unit despite the arrangement of the switch and plug unit on the housing accommodating the entire drive device.

Further advantageous developments and convenient forms of the invention will be gathered from the following detailed account of one embodiment thereof in conjunction with the accompanying drawings.

FIG. 2 shows the arrangement in accordance with FIG. 1 in the final assembly base plate of manufacture.

FIG. 3 is a view on a greater scale of the insulating bracket associated with the motor.

FIG. 4 is a view of part of the edge, which is connected with the hood, of the assembly base plate in section.

DETAILED ACCOUNT OF WORKING EMBODIMENTS OF THE INVENTION

Figure 1:
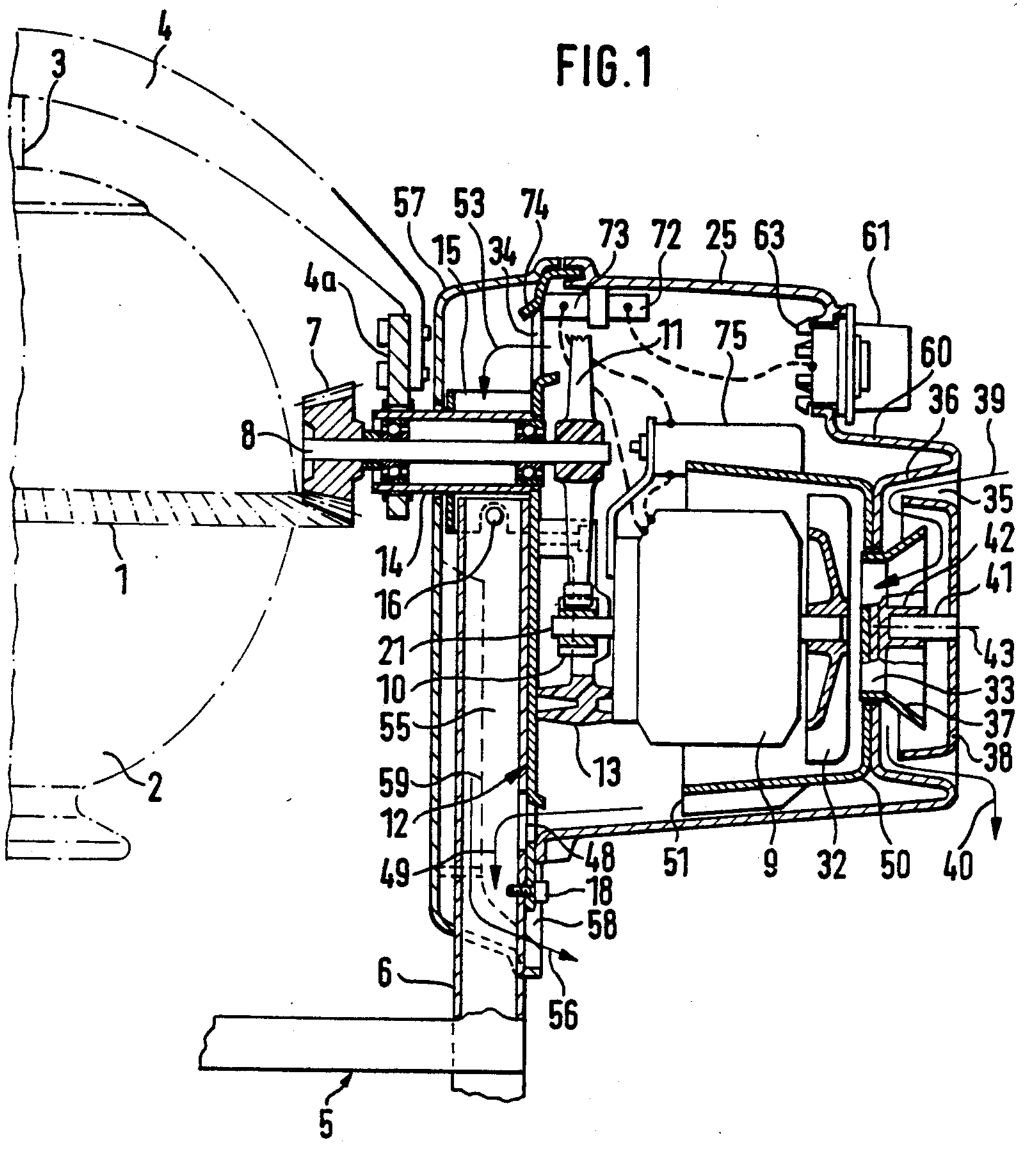
FIG. 1 shows a view of part of a constructional material mixer in accordance with the invention with the drive device vertically sectioned.

The basic construction and the manner of operation of mixers for constructional materials being generally known, the following account is restricted to details significant for the present invention. The mixer for constructional material as shown in FIG. 1 consists of a mixing drum 2 provided with a circumferential gear ring 1. The mixing drum 2 is bearinged on a king pin 3 which is arranged on a yoke 4, which for its part partly extends around the drum and is perpendicular to the gear ring 1. The yoke is mounted on a frame 5 (which normally has wheels for road transport) so that it may be pivoted about a substantially horizontal axis. The frame has for this purpose two vertical beams 6, of which only the beam 6 on the drive side is illustrated here.

A drive pinion 7 is in mesh with the gear ring 1 of the drum 2 and is mounted on a drive shaft 8 whose axis coincides with the pivot axis of the yoke 4. The shaft 8 is able to be driven by a drive motor 9 via a countershaft transmission, the motor being in the form of an electric motor in the present case. The countershaft transmission consists of a pinion 10 mounted on the stub shaft of the electric motor 9 and a gear wheel 11 in mesh with the pinion 10. Accordingly it is a question of a gear wheel countershaft transmission, which ensures a slip-free transmission of torque and little need for servicing. For the purpose of providing protective insulation of the mixer frame etc. one element of the countershaft transmission, in the present case the larger gear wheel 11, is fashioned of insulating material.

In order to accommodate the complete drive devive there is a plate-like component as an assembly base plate 12 or platform, which is in contact with the outer side of the frame beam 6 (which is on the drive side) and is supported by same. In order to provide for electrical safety insulation, the drive motor, which is in the form of an electric motor 9, is mounted on the assembly base plate 12 with the aid of an intermediate insulating bracket 13 which in order to provide for reliable three-point support has the configuration of a letter V. It is manufactured of insulating material. Furthermore a bearing pipe 14 is mounted on the assembly base plate 12, in which the drive shaft 8 runs. The bearing pipe or tube 14, whose one end is fastened to the assembly base plate 12, is additionally supported by a bracket 15, which projects on the drum side, on the assembly base plate 12. The bracket 15 simultaneously functions to hold the assembly base plate 12 on the associated beam 6 of the frame. The bracket 15 is for this purpose so designed that it may be slipped over the top end of the frame beam 6. In the illustrated working embodiment of the invention the bracket 15 is in the form of a U-like yoke fastened to the assembly base plate 12, such yoke having its lower end provided with notch-like recesses, which interlock with laterally projecting means on the frame beam 6, as shown at 16.

The drive end of the yoke 4 (which mounts the mixing drum) is mounted pivotally on the outer periphery of a section (which projects past the bracket 15) of the stationary bearing pipe 14. For this purpose there is a bearing unit having the bearing pipe extending through it, the bearing unit being in the present case in the form of a support lug 4*a*, which is held axially by spring washers, same being screwed to the adjacent end of the yoke. It is naturally possible to employ other types of pivot bearing means, for instance in the form of a clip open on one side, which is closed by an inserted wedge or chock or by the intermediary of pins connecting the limbs thereof together.

The complete drive device, in this case including the bearing unit carried on the bearing pipe 14, may be produced as a completed subassembly 17 able to be arranged on the assembly base plate 12, which for the final assembly operation is hooked to the associated frame beam 6, as shown in FIG. 2. In this respect the bracket 15 mounted on the assembly base plate 12 is moved into the position as shown in FIG. 1 with engagement with the lateral locking means or the frame beam 6. After this the complete assembly is secured by means of a retaining screw 18 which extends through the assembly base plate 12 and is secured to the frame beam 6 to prevent it being dislodged in an upward direction. After the said assembly has been put in place in the manner described, it is possible for the yoke 4 to be mounted, which is in this case bearinged on the drive side on the bearing pipe 14 belonging to the assembly 17. According the yoke 4 and the drum 2 are indicated in broken lines in FIG. 1.

As best shown in FIG. 3 the insulating bracket 13 possesses a generally V-like configuration and is screwed to the assembly base plate 12 adjacent to the upper ends of the its two limbs by screws 19. But on the other hand the insulating bracket 13 is screwed by further screws 20 (which do not contact the assembly base plate 12) to the motor 9. The insulating bracket 13 is provided with supporting heads, through which the screws 19 extend and which abut the assembly base plate 12. In order to produce a reliable three-point engagement the insulating bracket 13 is in this case provided with a support head having its lower tip in engagement with the assembly base plate 12, such head not being pinned to the assembly base plate 12. The desired three-point engagement is highly effective in preventing rocking of the motor 9.

In order to be able to vary the axial distance between the drive shaft 8 and the motor shaft 21, as is for instance necessary in the case of a modification of the transmission ratio of the countershaft transmission, the insulating bracket 13 is bodily pivoted about one of the holding screws 19. The other retaining screw may be provided with a plurality of through openings 22 on the bracket able to be used effectively. In the illustrated working embodiment of the invention as shown in FIG. 3 there are two mutually offset through openings 22 in the bracket. Simultaneously the assembly base plate 12 has two offset threaded holes associated with the holes 22 but offset a different amount in relation to each other. One respective through hole 22 and one threaded hole 23 are utilized so that many different positions are possible.

As shown best in FIG. 4 the assembly base plate 12 is provided with a circumferential edge flange 24, which increases the stiffness of the assembly base plate 12. The circumferentially extending edge flange 24 is as shown in FIGS. 1 and 2, only interrupted adjacent to the lower edge in order to constitute a lug associated with the securing screw 18. The edge flange 24 simultaneously functions as a receiving means for a hood 25, which as shown in clearly FIGS. 1 and 2, surrounds the complete drive device with the motor 9 and the countershaft transmission 10 and 11 as well. This hood 25 may be in the form of an injection molding or a deep-drawn component. The hood 25 is in sealing engagement with the edge flange 24. For this purpose the hood is, as furthermore shown in FIG. 4, provided with a circumferential and inwardly narrowing groove 26, into which the edge flange 24 fits. Adjacent to the floor of the groove there is sealing strip 27 placed loosely in position or if desired inserted by molding.

In order to attach the hood 25 to the assembly base plate 12 the latter is provided with threaded holes which in the present case are constituted by pressed on nuts 28 into which retaining screws may be screwed which extend through the hood. In order to ensure a firm fit the hood 25 is provided with molded on support domes 29 through which the retaining screws extend and which come into engagement with the assembly base plate 12. Such domes may be practically in the form of a continuation (which extends past the edge of the hood) of the wall of assembly grooves 30 associated with the retaining screws. In order to secure a reliable engagement between the hood 25 along its full periphery and the assembly base plate 12, the engaged flank is curved outward or made convex in the part between the retaining means which are generally arranged in the corners, as shown in FIG. 4 at 31.

The hood 25 and the assembly base plate shutting 12 it off on the drum side practically constitute a closed or sealed housing for the entire drive device, which, when the hood is fitted is no longer able to be reached from the outside. The motor placed within hood 25 is cooled by air drawn in from the outside. For this purpose the motor 9 is provided with an impeller 32 mounted on its stub shaft 21. The impeller is shut off on the side thereof facing the motor 9 and generally has the configuration of a plate with impeller vanes mounted thereon. The air moved by the impeller 32 is drawn in via an intake opening 33 provided adjacent to the assembly base plate 12 opposite to the hood 25 and in the backside thereof and is expelled through an outlet opening 34 provided adjacent to assembly base plate 12, as shown in FIG. 1 by arrows. The design in accordance with the invention with a comparatively large hood 25, which has the intake opening therein, makes it possible to have a large flow orifice and consequently a highly efficient cooling of the motor.

The intake opening 33 of the motor is preceded by a flow reversing intake duct 35 which in the present case is an annular passage coaxial to the intake opening. The flow reversing configuration of the intake duct 35 is responsible for highly efficient protection against splashing or spraying water. In order to form the intake duct 35 a rearwardly open concavity 36 is provided in the rear wall of the hood 25 which has the intake opening 33 therein. In the rearwardly open chamber formed by the concavity 36 concentric deflecting baffles are provided, of which at least one covers over the intake opening 33 with overlap. In the illustrated working embodiment of the invention there is for this purpose a conical guide 37 which widens towards the rear and adjoins the intake opening 33 and which is furthermore covered by an inwardly open bell 38, whose floor is generally flush with the rear edge of the drawn in part 36. The presence of these deflecting baffles means that there is the desired multiple deflection of the flow in the annular intake duct 35, as indicated by the arrow 39.

The jacket of the bell 38 surrounding the conical guide 37 is flared out conically towards its edge that is to say in the opposite direction to the conical guide 37. Furthermore the circumferential wall of the concavity or drawn in part 36 is spread out conically. The annular intake duct 35 is accordingly delimited by a plurality of oppositely directed conical parts, something which is responsible for a reliable interruption of water squirted into the intake duct 35 and simultaneously ensures that such water is able to run off to the outside as indicated by the arrow 40. Therefore washing of the intake duct 35 is possible so that the same may be left open even in the case of rough and ready use.

The conical guide 37 may be molded on the rear wall of the hood 25 which comprises the intake opening 33. In the illustrated working embodiment of the invention the conical guide 37 is constituted by a separate component and is mounted in a corresponding recess in the wall, something that facilitates production and leads to more freedom of choice as regards the material utilized. The same applies for the bell 38. In the illustrated working embodiment of the invention the conical guide 37 and the bell 38 are consequently screwed to the floor (in which the intake opening is provided) of the concavity 36. For this purpose it is possible for the bell 38 to be provided with a plurality of pins 41 evenly spread out around its periphery, which fit into sleeves 42 provided at the outer periphery of the conical guide 37 and receive screws 43 which are only indicated by the their center lines. The bell 38 and the conical guide 37 are accordingly held by the same fastening means.

Figure 5:
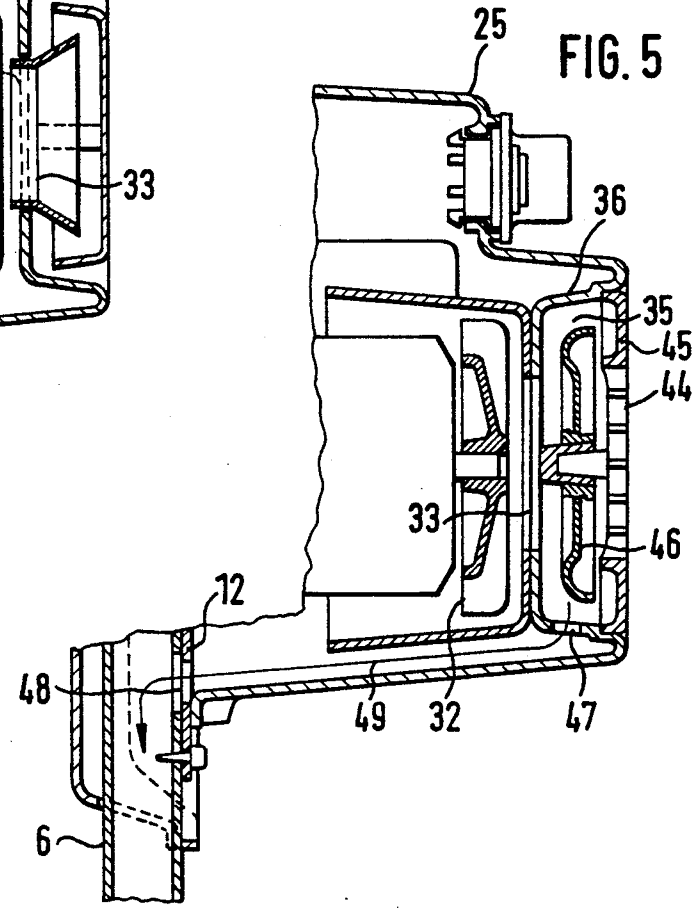
FIG. 5 shows a modified form of the intake duct in a view corresponding to FIG. 1.

In the case of the design of the intake duct 35 as shown in FIG. 5, which is a modification of the design in accordance with FIG. 1, the drawn in part 36 of the hood 25 is shut off by a perforated cover 44 which is flush with the drawn in part of the rear edge. The latter is provided with a circumferential crown 45 continued out by grid-like vanes and which fits over the out upwardly directed edge of an oversize baffle plate 46 arranged behind the same. The diameter of the baffle plate 46 is correspondingly larger than the diameter of the intake opening 33, which in this case is without any conical guide. In combination with the baffle plate 46 the grid cover 44 is responsible for a more particularly efficient jet interrupting action. Owing to the illustrated diameter ratios of the crown 45, of the baffle plate 46 and of the intake opening 33 there is the desired flow reversing function of the intake duct 35 which in the present case involves a triple reversal.

However any water getting inward as far as the baffle plate 46 is not able to run off to the outside owing to the circumferentially extending crown 45 of the grid cover 44. Accordingly at the lower side of the periphery of the drawn in part 36 there is a drain opening 47, via which any stray water is drained off into the space inside the hood, from which it is able to flow off via a drain recess 48 provided in the lower edge of the hood 25, as indicated by the arrow 49. The lower part of the hood 25 is accordingly designed with a slope towards the drain recess, something automatically produced by the casting operation. The drain recess 48 is located adjacent to the frame beam 6, which is provided with a corresponding recess so that water is able to drain off via the frame beam 6, which is normally tubular and in this case constitutes a drain duct and is generally open. At the lower end, the frame beam 6, constituting the drain duct in the present case, is generally open. The said drain recess 48 provides a drain pipe for water condensing within the hood 25 or minor quantities of water, for instance (as is unlikely to be the case) mist entrained by the air and caught by the impeller 32. For this reason a drain recess of this type may also be convenient in the case of the design illustrated in FIG. 1, as is marked at 48 and, respectively, 49 in FIG. 1. In other respects the designs in accordance with FIGS. 1 and 5 may be identical.

The air drawn in via the intake opening 33 is caused to flow along the motor 9 in order to efficiently cool it. For this purpose it is possible to provide a downwardly opening air guide part which adjoins the intake opening 33. In the illustrated working embodiment of the invention in accordance with FIG. 1 this air guide part is in the form of a bell 50 surrounding the motor 9 with clearance). This bell may be molded on the wall of the hood 25 having the intake opening 33 therein. In the illustrated working embodiment of the invention the bell 50 is constituted by a separate member mounted on the rest of the structure, this improving stackability. The bell 50 may accordingly be produced from comparatively cheap recycled material, while on the other hand for the hood 25 it is necessary to use comparatively high quality high-impact material. In order to retain the bell 50 in place it is possible in this respect to use the screws utilized to attach the deflecting baffles and consequently provided in any case. In order to ensure an internal stiffening of the hood 25 it is possible for the bell 50 to be provided with ribs 51 adjacent to its outer periphery and which may also function as limiting or stop means when stacking a plurality of bells on top of each other.

Figure 6:
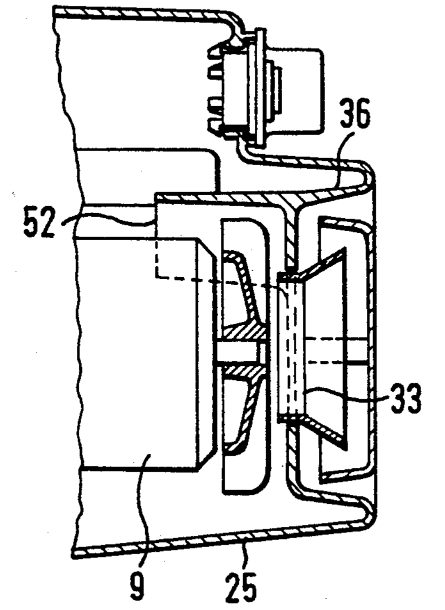
FIG. 6 shows a further possible design of the cooling air supply partly in a view like that of FIG. 1.

Given a suitable construction of the lower part of the bell 25 it may be sufficient if the air guide part only fits around the top part of the motor as is illustrated in FIG. 6. In this case the air guide part is designed in the form of a half-bell molded on the floor (which comprises the intake opening 33) of the drawn in part 36. The molded on half-bell 52 may be such that its sides run into the side walls of the hood 25 so that there is automatically an internal transverse stiffening of the hood 25. It would naturally be possible however to design the half-bell of the present type in the form of a part able to be inserted in the manner described above.

Figure 7:
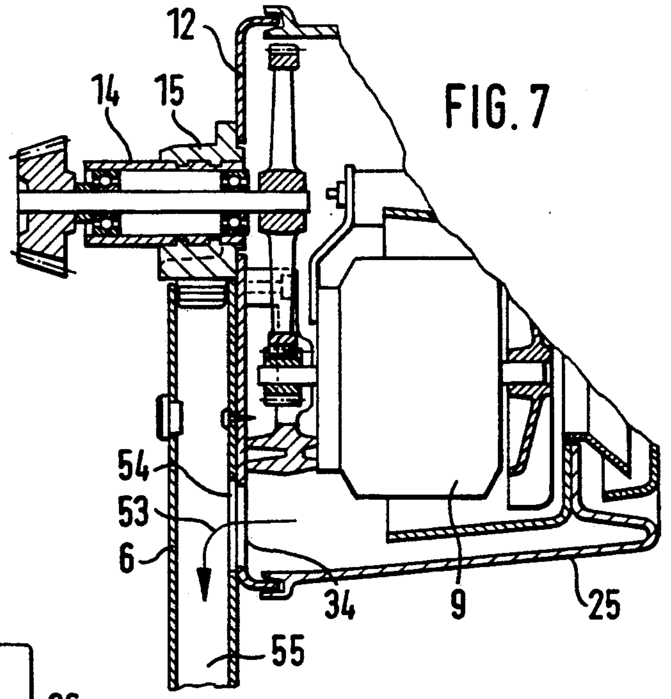
FIG. 7 shows a further possible design of the spent air duct in a view generally corresponding to that if FIG. 1.

Then as already mentioned the cooling air emerges via the spent air outlet opening 34, provided adjacent to the assembly base plate 12, from the inner space of the housing defined by the hood 25 and the assembly base plate 12, as indicated by the arrow 53 in FIGS. 1 and 7. In the case of the design in accordance with FIG. 7 the outlet opening 34 is adjacent to the frame beam 6, which is provided with a recess 34 in alignment with the same. The cooling air emerging as indicated by the arrow 53 accordingly flows into the frame beam 6, which is in the form of a pipe and which here accordingly functions as a spent air duct 55 adjoining the spent air opening 34. The lower end of the frame beam 6 is open so that the cooling air is able to flow out downwards. In the case of this design it is only necessary to ensure that the frame beam 6 has a sufficient orifice for 4 flow and is shut off at the top end. This closure of the top end results in the embodiment of the invention illustrated in FIG. 7 since the bracket 15, which is secured to the assembly base plate 12, is designed to receive the bearing pipe 14, which in the present case is in the form of a cast component with a male pin.

In the illustrated working embodiment of the invention in FIG. 1 the spent air opening 34 is provided in the upper edge part of the assembly base plate 12 outside of the frame beam 6. In this case as well this spent air opening 34 is however followed by a spent air duct 55, which is responsible for preventing any direct access to the space inside the housing comprising the drive device from the outside and accordingly leads to the desired protection against splashed water and spray and furthermore prevents electric shocks. Owing to the spent air duct 55 provided in the present case the cooling air emerging via the spent air opening 53 is deflected downwards and here discharged to the rear after repeated deflection underneath the hood 25 as indicated by the arrow 56. For this purpose a cap 57 is provided on the side, which faces away from the hood 25, of the assembly base plate 12, such cap 57 extending further down than the hood 25 so that there are two orifices or cross sections 58 (which are directed towards the rear) to the opening which laterally flank the frame beam 6, whose upper part extends into the cap 57 downwards.

Figure 8:
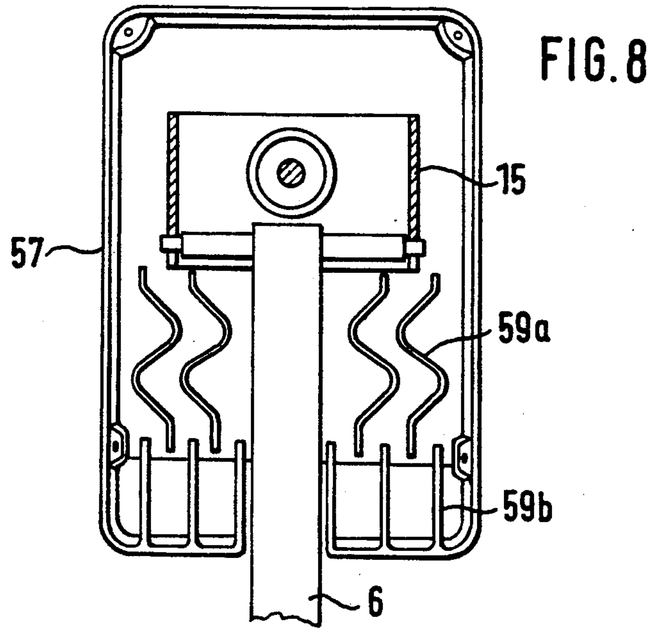
FIG. 8 shows a hood, which delimits the spent air duct, as seen from the assembly base plate.

In order to improve safety it is possible to provide jet interrupters 59 in the spent air duct 55 delimited by the cap 57. The same are in this case simply in the form of ribs molded internally on the cap 57, which as shown in FIG. 8, may have a meandering configuration. In the illustrated working embodiment of the invention the jet interrupters 59 additionally have a plurality of laterally offset sections 59*a* and 59*b*, something increasing the interrupting effect. It is consequently impossible for jets of water entering through the discharge orifice 58 to rise as far as the spent air opening 34. In the case of the embodiment of the invention illustrated in FIG. 7 this is even prevented by the fact that the spent air duct 55 constituted by the frame beam 6 extends downwards a comparatively large distance so that interrupting means are not required. The cap 57 may be mounted without and special sealing features on the assembly base plate 12 and may be screwed to it. In order to however to drain of any stray drips of water it is possible to provide oppositely extending projections 74 at which water collects to form drips on the upper and lower edge of the spent air opening 34.

Figure 9:
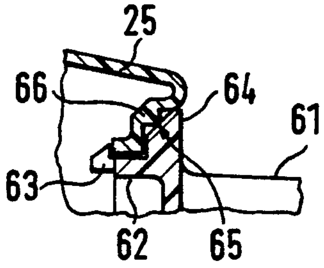
FIG. 9 is a view of part of the switch and plug unit mounted on the hood, in section.

Above the motor 9 the hood 25 is as furthermore shown in FIG. 1 designed with receding steps. The inwardly receding form of the wall provided for this purpose at 60 only shortens the distance (present in the upper hood part only accommodating the gear wheel 11 and the capacitor 75) between the assembly base plate and the rear wall of the hood 25, something that has an advantageous effect as regards rigidity. Simultaneously the niche provided by the drawn in part of the wall constitutes a suitable site for a switch and plug unit 61. This unit is in the present case is in the form of a separate structure that is mounted on the hood 25. For this purpose the switch and plug unit 61 is, as shown in FIG. 9, provided with a collar 62 able to be inserted in an associated recess in the wall of the hood 25, such collar being provided with catch teeth 63 distributed regularly about the periphery which fit behind the edge of the associated wall recess. The support ledge opposite to the catch teeth 63 is constituted by a flange 64 molded on the collar 62. The flange is in the present case provided with a molded on sealing surface 65 for cooperation with a sealing edge 66. The reverse arrangement would also be possible.

Figure 10:
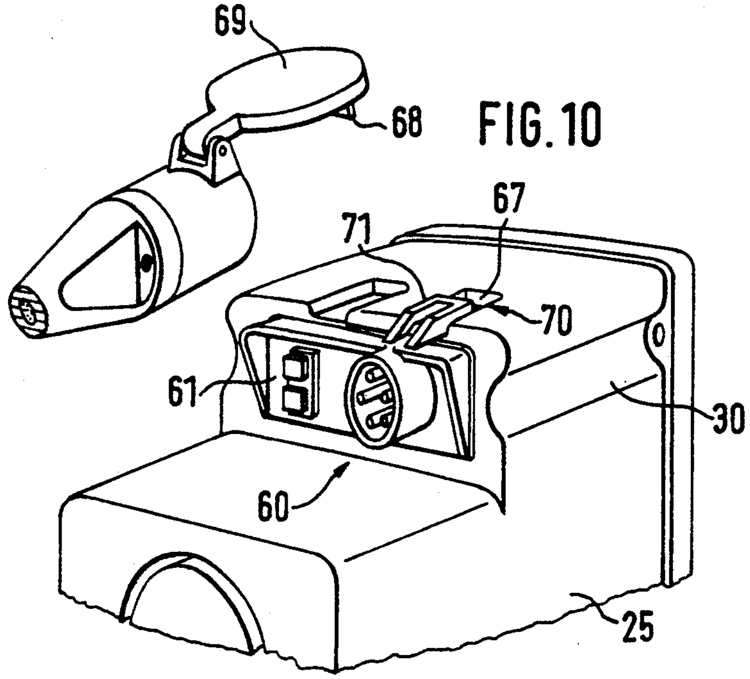
FIG. 10 is a perspective view of a hood provided with a three-phase switch and plug unit.

In the case of a three-phase design the switch and plug unit 61 is provided with a specially defined socket 67 to receive a locating tooth 68 on a plug lid, as best shown in FIG. 10. For this purpose in this case the upper wall (which extends away from the stepped, drawn in wall part 60 associated with the switch and plug unit 61) of the hood 25 is provided with a groove 70, into which there fits a pin 71 molded on the switch and plug unit 61 and made shorter than the groove 70 so that the socket 67 is defined.

The switch and plug unit 61 as mounted on the hood 25 is, as furthermore shown in FIG. 1, electrically connected with an electrical coupling part 72 arranged on the inner side of the hood adjacent to the front edge of the hood. On the assembly base plate 12 a mating part 73 is mounted, which is electrically connected with the motor 9 or, respectively, with its capacitor. On mounting the hood 25 the coupling element 72 will automatically come into plugged engagement with the associated mating part 73 so that the electrical connection is produced. On removing the hood 25 the two coupling parts will also be separated from each other so that the exposed motor will be electrically disconnected and completely safe. Simultaneously the plug coupling provided at the wiring facilitates the use of the switch and plug unit mounted on the hood 25.

We claim:

1. A mixer comprising:

a frame;

a yoke pivotally mounted to said frame;

a drivable drum rotatably mounted on said yoke;

a drive unit in driving connection with said drivable drum, said drive unit affixed to a side of said frame, said drive unit comprising:

an air-cooled electric motor;

a drive shaft connected to said electric motor and to said drum, said drive shaft mounted coaxially through a countershaft transmission with a pivoting axis of said yoke;

a housing affixed to said side of said frame, said housing having said electric motor, said drive shaft and said countershaft transmission arranged therewithin, said housing having a switch/plug unit affixed thereto and interconnected to said electric motor, said housing being a liquid-tight encasement, said housing having an area opposite said side of said frame, said area having an air intake opening formed therein, said area having an air intake duct leading to said air intake opening, said air intake duct mounted coaxially to said air intake opening, said intake duct being a multiple-turn flow-reversing duct, said housing having an outlet opening formed on a side adjacent said side of said frame, said outlet opening having an exhaust duct leading therefrom, said exhaust duct extending exterior of said housing so as to form a barrier to liquid-access to an interior of said housing.

2. The mixer as claimed in claim 1, said housing having a hood which opens on a side adjacent said drum, said housing having an assembly base plate which receives said hood, said assembly base plate adapted to be secured to a beam of said frame, said motor being mounted to said assembly base plate.

3. The mixer as claimed in claim 2, further comprising:

a bearing pipe mounted to said assembly base plate, said bearing pipe supported by a bracket affixed to said beam, said bracket having said drive shaft extending therethrough, said bracket having a drive end of said yoke pivotally mounted thereto.

4. The mixer as claimed in claim 2, wherein the assembly base plate has an insulating bracket mounted thereon, said insulating bracket having an insulating material thereon, said insulating bracket being mounted to the motor, said motor being releasably mounted to said insulating bracket by separate fasteners.

5. The mixer as claimed in claim 1, wherein the intake duct is positioned in an outwardly opening concavity of said area, said intake duct is adapted to cause reverse flow by at least one deflector insert positioned coaxial to the intake opening.

6. The mixer as claimed in claim 5, wherein the intake opening adjoins an outwardly widening conical air guide, said air guide being covered by a bell with an inwardly directed jacket, said air guide and said bell being in the form of components which are separable from the housing.

7. The mixer as claimed in claim 5 wherein said concavity is provided with a grid-like cover whose edge is flush thereto, and wherein the intake opening is covered by a baffle plate which is coaxial to the intake opening and has an outwardly directed edge.

8. The mixer as claimed in claim 1, wherein the intake opening communicates with an air guide which at least partly surrounds the motor.

9. The mixer as claimed in claim 1, wherein the motor is provided with an impeller facing the intake opening.

10. The mixer as claimed in claim 2, wherein the assembly base plate has a drain opening into said beam of said frame, said beam being open at a lower end thereof.

11. The mixer as claimed in claim 2, wherein the outlet opening leads into the assembly base plate, said exhaust duct extending within said beam, said exhaust duct having an open lower end and a closed upper end.

12. The mixer as claimed in claim 2, wherein the exhaust duct comprises a cap mounted on a side of the assembly base plate adjacent the drum, said cap projecting downwardly past the hood.

13. The mixer as claimed in claim 2, wherein the assembly base plate has an edge flange extending at least partly therearound and fitting into a groove which extends at least partly around the periphery of said assembly base plate, said assembly base plate provided with a sealing strip narrowing in an inward direction.

14. The mixer as claimed in claim 2 wherein the switch/plug unit is in the form of a separate component, said switch/plug unit is provided with catch teeth locking behind an edge of a recess in the hood, said switch/plug unit having a circumferentially extending sealing element, said hood having at least one groove into which a pin molded on the switch/plug unit is seated, said pin being shorter than the groove.

15. The mixer as claimed in claim 2, further comprising an electrical coupling which is electrically connected with the motor and is mounted on the assembly base plate, said coupling being pluggedly connected with another coupling mounted on the hood and electrically connected with the switch/plug unit.

16. The mixer as claimed in claim 1 wherein said flow reversing intake duct is adapted to reverse the air flow more than once.

* * * * *